Nov. 13, 1962

S. M. KRITSER 3,063,626

NAVIGATION AID

Original Filed April 22, 1959

INVENTOR

SHELBY M. KRITSER

BY *Jacobi & Davidson*

ATTORNEYS

Nov. 13, 1962 S. M. KRITSER 3,063,626
NAVIGATION AID
Original Filed April 22, 1959 2 Sheets-Sheet 2

INVENTOR
SHELBY M. KRITSER
BY Jacobi & Davidson
ATTORNEYS

United States Patent Office 3,063,626
Patented Nov. 13, 1962

3,063,626
NAVIGATION AID
Shelby M. Kritser, Box 2091, Amarillo, Tex.
Original application Apr. 22, 1959, Ser. No. 808,243, now Patent No. 3,043,503, dated July 10, 1962. Divided and this application Mar. 5, 1962, Ser. No. 177,572
5 Claims. (Cl. 235—61)

This application is a division of my copending application, Serial No. 808,243, filed April 22, 1959, now Patent No. 3,043,503.

This invention relates to navigation aids, and more particularly to navigation computers especially suited for use in connection with radio navigation techniques employed with respect to aircraft flight.

It is an object of the invention to provide an improved navigation aid for use by pilots both in the air and on the ground and for use by students in learning radio navigation.

Other objects, as well as features and advantages of the invention will be apparent from the following detailed description of a preferred embodiment thereof, as illustrated in the accompanying drawing, in which.

As noted above, the computer of invention is intended for use by pilots both in the air and on the ground, and by students in learning radio navigation. The computer facilitates ascertaining aircraft position in flight with respect to ground radio facilities or stations.

Of the various types of aerial navigation, radio navigation has become by far the most important. In fact, governmental regulation is predicated on the use of radio navigation.

In accordance with the invention, there is contemplated the provision of a single computer provided for operation or calculation in association with two different systems of radio navigation. One section of the computer is devoted to problems involving the use of automatic direction finder (ADF) apparatus, and a second section of the computer is employed to solve problems relating to OMNI (very high frequency OMNI range stations, VOR) apparatus. Both the ADF and OMNI systems are most commonly employed in association with aircraft today and, accordingly, the invention is directed thereto.

The OMNI or OMNI-guide section of the computer is based upon the use of VOR or OMNI stations, and further, on the use of suitable air-borne OMNI radio equipment.

The air-borne equipment includes a suitable VHF receiver which may be tuned by the pilot to a predetermined OMNI station, with an audio device by means of which the pilot may select the station identification signals. The air-borne equipment further includes an OMNI bearing selector which is calibrated from zero through 360° and which the pilot can manually adjust to select any desired OMNI bearing. Also included in the air-borne equipment is a To-From indicator. This indicator, after a station has been selected and the OMNI bearing set, will show whether the aircraft is on the To side of the station in the Neutral zone beam of the station, or on the From side of the station. The air-borne equipment also includes a flight path deviation indicator which shows whether the aircraft is located directly on the selected OMNI bearing or to the left or right of this bearing. The indicator conventionally is provided with a yellow and blue area and, if the bearing is to the right of the aircraft, the indicator will be deflected to the right or yellow area, whereas if the OMNI bearing is to the left of the aircraft, the indicator will be deflected to the left or blue side of the indicator. This indicator, as will be noted hereinafter, is illustrated on the computer.

Figure 1:
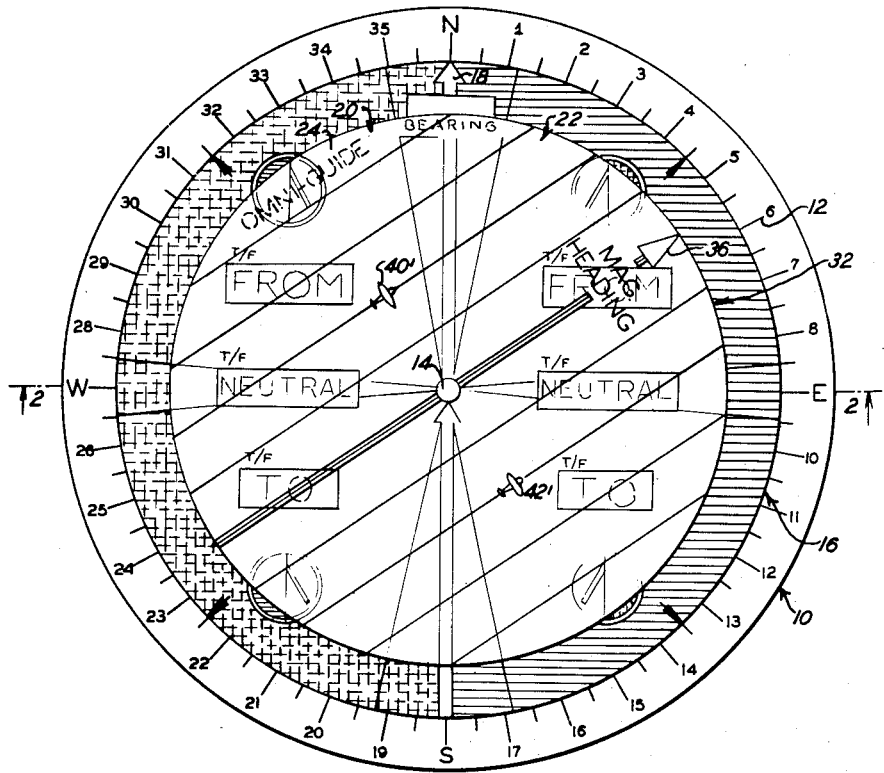
FIG. 1 is a front elevational view of a computer provided in accordance with the invention, the view illustrating the side of the computer suited for use with OMNI apparatus.
Figure 2:
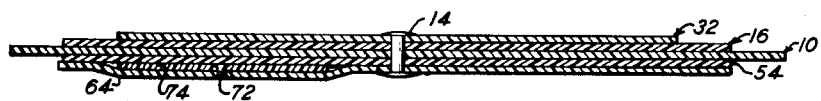
FIG. 2 is a sectional view of the apparatus of FIG. 1, taken along line 2—2 of FIG. 1.

Reference is next made to FIGS. 1 and 2, for purposes of illustrating a preferred embodiment of an OMNI computer provided in accordance with the invention.

In accordance with the invention, the section of the computer adapted for use with the OMNI system of navigation comprises a base member 10 which is preferably in circular form. The base member 10 is preferably a flat or planar member made of plastic or similar material.

Base member 10 is provided thereupon with a circular or polar scale calibrated in degrees. As illustrated, the scale may be provided with markings, each representing an increment of 5 angular degrees, every other one of which is provided with a number representing the total number of degrees with respect to North in conventional manner. The computer is generally used with North being directed vertically upwards, and at each 90° interval the scale is provided with letters N, E, S and W, representing respectively, North, East, South and West.

Located centrally of the base member is a pivot, pin or shaft 14 which may be of metal or any similar material having the requisite structural strength. The pivot 14 serves not only to rotationally support other members, as will be shown, but furthermore represents the radio navigation station with respect to which the navigational problem is to be calculated.

Immediately above the base member 10 is positioned a disc 16. This disc, which may be designated as the OMNI disc, is rotated to correspond to selected OMNI bearing, as will be explained. Disc 16 is preferably of a transparent or translucent plastic and is of circular configuration. It is provided with a radially or diametrically disposed indicator 18, which may be aimed at a particular point on scale 12 so that the disposition of disc 16 is correlated with the selected OMNI bearing.

Lying immediately above disc 16 is a further disc 32. This disc may be designated as the heading disc. Disc 32 is provided with a central aperture 34, by means of which the disc 32 is rotatably accommodated on pin 14, discs 32 and 16 being concentric with each other and to circular scale 12. Disc 32 is provided with a radially or diametrically disposed indicator 36 and with a plurality of parallel lines 38 which are parallel to each other and to indicator 36. There may be illustrated on the disc 32 airplane silhouettes 40 and 42.

Further details of the preferred arrangement of the OMNI section of the computer are fully explained in the parent application hereof, Serial No. 808,243, filed April 22, 1959, and since the present divisional application is directed to the ADF navigation system or computer specifically, further reference is not made herein to the OMNI section.

Base member 10 and discs 16 and 32 are shown mounted on pin 14 in section in FIG. 2. FIG. 2 further illustrates the relationship to the OMNI section of the computer of the ADF section of the computer. For further details with respect to the ADF section of the computer, reference is next made to FIGS. 3 and 4.

The ADF section of the computer is intended to function with respect to automatic direction finder apparatus.

This type of apparatus consists of air-borne receiver tunable by the pilot to the desired radio frequency, an indicator with a 360° azimuth and a model airplane pointed to zero in the azimuth, and an ADF pointer that rotates over the model aircraft and points to the tuned station.

Figure 3:
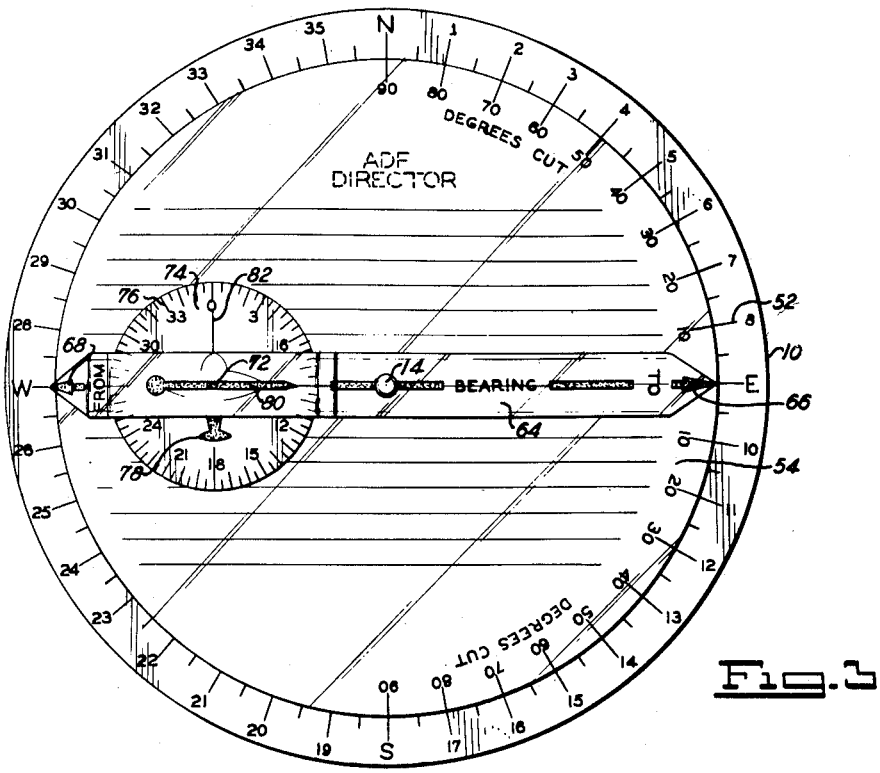
FIG. 3 is a rear elevational view of the computer of FIG. 1, the view illustrating the side of the computer which is suitable for use with automatic direction finder equipment.
Figure 4:
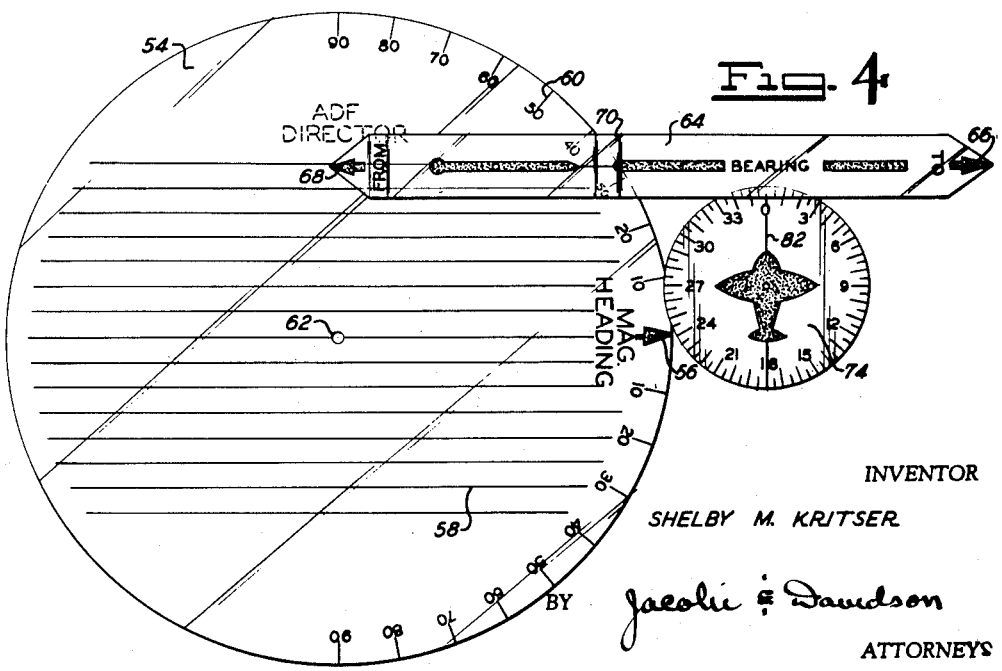
FIG. 4 illustrates, partially separated, a disc and associated members of the computer as illustrated in FIG. 3.

In FIGS. 3 and 4, the ADF section of the computer includes the base member 10 indicated above and provided with a further circular or polar scale 52 calibrated in angular degrees. The scale 52 encircles a disc 54 at the periphery of the latter. Disc 54 is provided with a radially or diametrically disposed indicator 56, as well as with a plurality of lines 58 which are parallel to each other and to indicator 56. Disc 54, which is the magnetic heading disc, is peripherally calibrated in degrees by a scale 60 representing degrees cut. Disc 54 is provided with a central aperture 62 adapted for mounting disc 54 on pivot 14. Disc 54 and circular scale 52 are concentrically disposed about this pivot.

Also mounted on pivot 14 is a pointer or cursor 64. The pointer 64 is a magnetic bearing pointer and is provided with a radially or diametrically disposed indicator 66, indicting direction to the station whose location is identified by pivot 14, and with an indicator 68 which is radially or diametrically disposed with respect to pivot 14, the indicator 68 indicating bearing from the station whose position is homologous to the pivot 14. The pointer is provided with a centrally located aperture 70, by means of which the pointer is rotatably supported on the pivot 14. With the pointer so supported, its extremities circumscribe a circle corresponding to the periphery of disc 54.

A pin 72 is provided on the pointer 64 at a position intermediate its From extremity and the pivot 14. On pin 72 is mounted a wheel 74 which is positioned between the disc 54 and the pointer 64. Pointer 64, wheel 74 and disc 54 all define approximately parallel planes, aside from the indicated deformation of pointer 64 which is illustrated in FIG. 2.

Wheel 74 is provided with a circular or polar scale 76 running from zero to 360°, and also is provided thereupon with a silhouette 78 of an aircraft, the nose of which is directed towards zero degrees. Pointer 64 is provided with a central longitudinal line or indicator 80, with respect to which silhouette 78 is aligned.

For the pilot or student to determine pictorially his aircraft's position relative to the associated station, and/or to obtain a magnetic bearing with respect to the station, the following procedure is employed:

The magnetic heading of the aircraft is obtained by a reading of the compass of the aircraft, and the heading disc 54 is rotated so that indicator 56 indicates on scale 52 the magnetic heading. For example, in FIG. 3 the heading disc 54 is aligned to indicate a magnetic heading of 90°, or due East. Next, the ADF indicator which forms a part of the air-borne equipment is read, and wheel 74 is rotated so that silhouette 78 defines with indicator 80 an angle corresponding to the ADF indication. In FIG. 3, for example, this angle is 90°, with the silhouette 78 being pointed in a direction corresponding to North.

Pointer 64 is then rotated about pivot 14 so that the diametrical line or indicator 82 on wheel 74 runs parallel to lines 58 on disc 54. With silhouette 78 aligned at a predetermined angle with respect to indicator 80 and, therefore, to pointer 64, and with indicator 82 parallel to lines 58 (this condition is not illustrated in the drawing), indicator 66 on pointer 64 will then indicate on scale 52 the magnetic bearing to the station represented by pivot 14. At the same time, the indicator 68 will indicate on scale 52 the magnetic bearing from said station. As a feature of the invention, the silhouette 78 will also pictorially represent the position and direction of the aircraft relative to the station, this being represented by the relative position of silhouette 78.

By referring to degrees cut on scale 60 of disc 54, the pilot can immediately tell what angle the nose of his airplane is at with respect to the bearing to the station. This scale is also useful in establishing a wind correction angle, so that the airplane can stay on a given line on magnetic bearing in a cross-wind.

In summary, the invention provides a computer adapted for multiple application and especially suited for use with OMNI and automatic direction finding navigation systems. The computer of the invention is very easy to employ and gives a pictorial representation of the position of an aircraft relative to a station. By use of the computer of the invention, pilots and students may practice theoretical or actual problems in such a manner as to facilitate their understanding of the problems involved.

The invention moreover incorporates the feature of employing a single base member in cooperative association with two computer sections, so as to reduce the costs and further reduce the amount of apparatus which must be carried.

There will now be obvious to those skilled in the art many modifications and variations of the structure set forth above. These modifications and variations will not, however, depart from the scope of the invention, unless they lie outside the scope of the following claims.

What is claimed is:

1. A navigation aid for use with automatic direction finder apparatus which indicates bearing from a station comprising a base member, a disc, a pointer, a pivot representing said station and rotatably supporting the pointer and disc on said member, the pointer describing a circle corresponding with the periphery of the disc, and a wheel rotatable on said pointer, said base member having thereon a circular scale calibrated in degrees and encircling said disc, said disc having thereon a radially disposed magnetic heading indicator, and said wheel having thereon a circular scale calibrated in angular degrees and a radial indicator indicating zero degrees, the wheel indicator pictorially representing position with respect to said station with the wheel indictor angularly disposed with respect to said pointer by an angle corresponding to said bearing and with the wheel indicator parallel to the disc indicator.

2. A navigation aid as claimed in claim 1 where said pointer is provided with radially disposed indicators for indicating with respect to the circular scale on said base member, one of the indicators on said pointer indicating direction to said station and the other indicator on said pointer indicating direction from said station.

3. A navigation aid as claimed in claim 1 wherein said disc is provided thereupon with a polar scale indicating degrees cut.

4. A navigation aid as claimed in claim 1 wherein said disc is provided with a plurality of parallel lines which are in turn parallel to the radially disposed magnetic heading indicator of said disc.

5. A navigation aid for use with automatic direction finder apparatus which indicates bearing from a station, comprising a disc, a pointer, a pivot representing said station and rotatably supporting the pointer with respect to said disc, the pointer describing a circle corresponding with the periphery of said disc, and a wheel rotatably on said pointer, said wheel having thereon a circular scale calibrated in angular degrees, and a radial indicator indicating zero degrees, the wheel indicator pictorially representing position with respect to said station, with the wheel indicator angularly disposed with respect to said pointer by an angle which corresponds to said bearing.

References Cited in the file of this patent

UNITED STATES PATENTS 2,674,804    Reinhardt _____ Apr. 13, 1954